United States Patent
Samuel et al.

(10) Patent No.: US 11,429,457 B2
(45) Date of Patent: Aug. 30, 2022

(54) SYSTEM AND METHOD TO SECURELY EXCHANGE SYSTEM DIAGNOSTICS INFORMATION BETWEEN FIRMWARE, OPERATING SYSTEM AND PAYLOAD

(71) Applicant: DELL PRODUCTS L.P., Round Rock, TX (US)

(72) Inventors: Balasingh P. Samuel, Round Rock, TX (US); Michael Wayne Arms, Pflugerville, TX (US); Adolfo S. Montero, Pflugerville, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 412 days.

(21) Appl. No.: 16/584,045

(22) Filed: Sep. 26, 2019

(65) Prior Publication Data
US 2021/0096931 A1 Apr. 1, 2021

(51) Int. Cl.
G06F 11/00 (2006.01)
G06F 9/54 (2006.01)
G06F 11/07 (2006.01)

(52) U.S. Cl.
CPC .......... *G06F 9/541* (2013.01); *G06F 11/0721* (2013.01); *G06F 11/0751* (2013.01); *G06F 11/0772* (2013.01); *G06F 2209/547* (2013.01)

(58) Field of Classification Search
CPC ............ G06F 11/0721; G06F 11/0751; G06F 11/0772; G06F 11/0706; G06F 11/0775; G06F 11/0766
See application file for complete search history.

(56) References Cited

U.S. PATENT DOCUMENTS

| 9,258,765 | B1 | 2/2016 | daCosta |
| 9,589,121 | B2 * | 3/2017 | Hamlin .............. G06K 9/00087 |
| 9,851,968 | B2 | 12/2017 | Straub |
| 2004/0259640 | A1 | 12/2004 | Gentles et al. |
| 2007/0162957 | A1 | 7/2007 | Bartels |
| 2008/0109889 | A1 | 5/2008 | Bartels |
| 2011/0010543 | A1 | 1/2011 | Schmidt et al. |
| 2016/0019116 | A1 * | 1/2016 | Gopal ................. G06F 11/1417 714/19 |
| 2016/0350166 | A1 * | 12/2016 | Andrews ............. G06F 11/0751 |
| 2018/0041588 | A1 | 2/2018 | Straub et al. |
| 2019/0243660 | A1 * | 8/2019 | Joshi ..................... G06F 9/4403 |

FOREIGN PATENT DOCUMENTS

| KR | 20170140157 A | 12/2017 |
| WO | 2012097356 | 7/2012 |
| WO | 2015036773 | 3/2015 |

* cited by examiner

*Primary Examiner* — Katherine Lin
(74) *Attorney, Agent, or Firm* — Jackson Walker LLP; Christopher J. Rourk

(57) ABSTRACT

A system for secure processing of intra-processor data comprising firmware configured to operate on a processor. An operating system configured to operate on the processor. Payload configured to operate on the processor. An embedded controller coupled to the firmware, the operating system and the payload, wherein the embedded controller is configured to enable messaging between the firmware, the operating system and the payload.

20 Claims, 2 Drawing Sheets

SYSTEM AND METHOD TO SECURELY EXCHANGE SYSTEM DIAGNOSTICS INFORMATION BETWEEN FIRMWARE, OPERATING SYSTEM AND PAYLOAD

TECHNICAL FIELD

The present disclosure relates generally to data processing, and more specifically to a system and method to securely exchange system diagnostics information between firmware, an operating system and pre-boot payloads.

BACKGROUND OF THE INVENTION

Communication of suspected hardware failures between the operating system and/or firmware and a Unified Extensible Firmware Interface is not presently possible, because a mechanism for such communications is not available.

SUMMARY OF THE INVENTION

A system for secure processing of intra-processor data, such as data to be exchanged between systems and components of the processor, is disclosed. The system includes firmware configured to operate on a processor, an operating system configured to operate on the processor and payload configured to operate on the processor. An embedded controller is connected to the firmware, the operating system and the payload and is configured to enable messaging between the firmware, the operating system and the payload.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
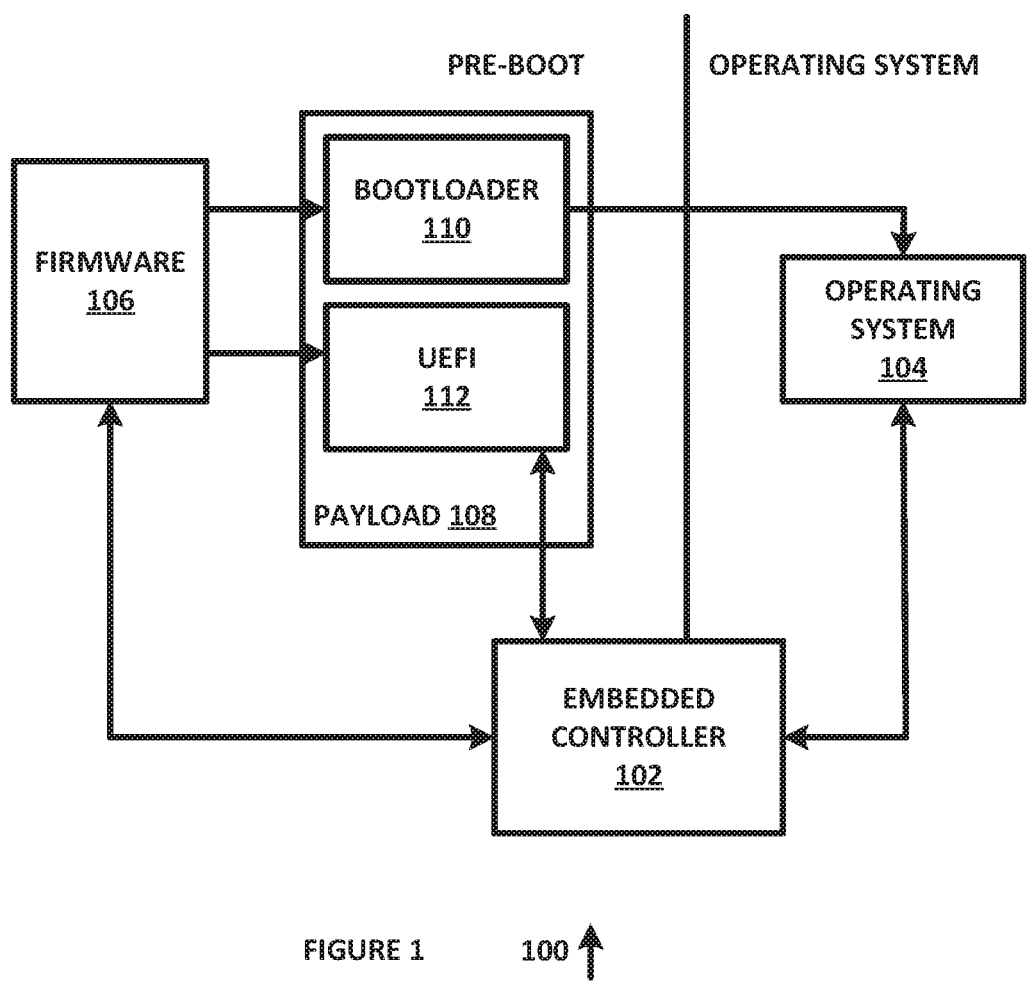
FIG. 1 is a diagram of a system for securely exchanging system diagnostics information between firmware, an operating system and payload, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

The Unified Extensible Firmware Interface (UEFI) is an industry specification that defines a software program for connecting the firmware (FW) of a processor to its operating system (OS) (such as Chrome). UEFI is different from the basic input/output system (BIOS), and it is expected that UEFI will eventually replace BIOS. UEFI is usually installed when the processor is manufactured. When a processor is turned on, UEFI can be the first program that it runs. In some configurations, one or more programs or controls (which may be referred to as a "payload") with an onboard (pre-boot) diagnostics module can be integrated with firmware (such as Coreboot) to augment UEFI and OS functionality.

Typically, no UEFI payload is necessary for some operating systems (e.g. Chrome OS, which uses a Coreboot firmware service to initialize hardware and boot to Chrome OS). In one example embodiment, the embedded controller (EC) firmware is always running alongside with FW (such as Coreboot), a UEFI payload and the operating system (such as Chrome OS). In this example embodiment, the EC firmware is running in all different domains, and the UEFI payload (such as diagnostics or a service module) and operating system (e.g. Chrome OS) are never running at the same time. Likewise, other suitable embodiments can also or alternatively be used (such as other suitable firmware and operating systems, or configurations where the EC firmware is not always running at the same time as the other FW, such as when it is stopped for other tasks, or when it is otherwise coordinated with the FW and OS). The UEFI payload can be loaded and executed by the firmware (such as Coreboot or other suitable firmware) at a suitable time (such as on the next subsequent boot) if the operating system detects an error, can be manually launched by the end-user or can be actuated in other suitable manners. The present disclosure relates to exchanging information between the operating system (Chrome OS)/firmware (Coreboot) domain and the UEFI payload domain via EC firmware, which may not be applicable for certain operating systems. For example, the prior art can pass messages between Windows or Linux and UEFI, because both Windows and Linux use the UEFI BIOS. In another example embodiment, UEFI runtime services/system management mode (SMM) services can always be available in the operating system (such as Windows, Linux OS or other suitable operating systems) when the platform is booted with UEFI BIOS (firmware), or other suitable processes can also or alternatively be used. In this manner, established and preexisted methods on the processor can be used for the OS agents to communicate with the UEFI firmware (as opposed to a need to install any new functionality). In the case of Chrome OS, there may be no way for the OS agent to directly communicate with the UEFI payload (such as if it is not running at the same time). In this manner, the operating system (such as Chrome OS or other suitable operating system) agents can communicate to the UEFI payload via EC firmware without the need for the firmware (such as Coreboot or other suitable firmware) getting involved.

When the FW or OS detects an error, such as a suspected hardware failure or OS image corruption, the response is typically to reboot the processor and run a UEFI diagnostics payload. However, in existing processor architectures, there is no mechanism available to communicate suspected hardware failures between the FW/OS context and the UEFI payload context. Similarly, when the UEFI payload (such as an onboard diagnostics module) detects a confirmed failure, there is no mechanism available to communicate the associated details for that failure to the FW or OS, to allow those systems to perform corrective actions.

Without an additional system to address this problem, a user typically must decide between reimaging the OS (also known as OS recovery) or initiating hardware diagnostics. For example, when a fan failure is detected, reimaging the OS typically comes up as an option in the pre-boot menu. This option can cause a user to believe that OS recovery might be a recommended choice to fix a hardware issue, such as a failed fan, which can lead to inconvenience to the customer and unnecessary support calls.

The present disclosure addresses this and other problems, by intelligently prompting appropriate actions that match the specific failure type (such as hardware errors as opposed to software errors). This function can be accomplished by transferring information between the UEFI context and the FW and/or OS context, such as by using a system embedded controller (EC). The system EC acts as a messaging agent between the UEFI payload context and the FW and/or OS context to communicate detailed error information across the two domains.

In one example embodiment, the OS (such as Chrome OS) and/or FW (such as Coreboot) can detect a potential hardware failure, health deterioration, software error or other similar notifications or messages. The OS and/or FW can then negotiate with an embedded controller to raise the trust level, after which the OS and/or FW can post the notification or message to the EC using a memory mapped input/output (MMIO) interface or in other suitable manners. The message protocol can be configured to distinguish between the two error types (such as hardware and software), or other suitable message or notification types, such as "warning."

During the processor boot process, the FW (such as Coreboot or other suitable FW) can read a diagnostics notification message or other suitable data from the EC and, if a failure is present, can determine whether the failure is a hardware or software failure, such as by reading the error type from the EC. If a diagnostics notification message is detected, then the FW payload (such as Depthcharge or other suitable payload) can launch a pre-boot recovery menu or take other corrective actions. If an error type is hardware, the FW can prompt UEFI diagnostics (or other suitable onboard hardware diagnostics), can launch a UEFI diagnostics payload, or can initiate other suitable actions. This process can be used to provide clarity to users, such as to automatically run a hardware diagnostics tool on the system to detect hardware failures or for other suitable purposes.

In contrast, if an error type or other notification is for a software error, the FW (e.g. Coreboot) can initiate an OS software recovery menu. In this manner, the process can be automated to eliminate the need for a user to evaluate the correct course of action. The UEFI payload can also or alternatively send a response message back to a FW and/or OS context to inform end users.

The present disclosure provides a number of important technical advantages. In one example embodiment, inter-EC communication can be used to transfer messages between the FW and/or OS context and the UEFI context. The messages can be diagnostic in nature, can include security incident reporting, or can be used for other suitable messages. The present disclosure further allows messages to be transferred between two different pre-boot environments, such as UEFI and FW. The same UEFI diagnostics tool can thus be used on different OS environments, such as for a Windows OS and Chrome OS environment. The present disclosure helps to reduce unnecessary support calls and cost, as hardware issues and software issues typically require different corrective actions. A user can be clearly prompted with instructions to recover the OS or replace hardware based on the diagnostics information. The present disclosure thus eliminates user uncertainty and guess work, and helps to prevent user recovery of the OS in the case of hardware issues (such as fan failure and battery defect). The present disclosure also allows for targeted diagnostics in OS environments, such as to run memory error alerts when the OS detects a potential memory failure, or to run fan diagnostics when the OS detects a potential fan failure While targeted diagnostics are available in some pre-boot environments, there are presently no targeted diagnostics in the Chrome OS environment because there is no data exchange method that is currently available between the Coreboot FW and/or Chrome OS context and the UEFI context.

FIG. 1 is a diagram of a system 100 for securely exchanging system diagnostics information between firmware, an operating system and payload, in accordance with an example embodiment of the present disclosure. System 100 includes embedded controller 102, operating system 104, firmware 106, payload 108, bootloader 110 and UEFI 112, each of which can be implemented in hardware or a suitable combination of hardware and software.

Embedded controller 102 can be implemented in silicon and can include one or more logical processors, memory devices, input devices, output devices, bus interfaces and other suitable devices. In addition, embedded controller 102 can include one or more algorithmic structures in hardware or a combination of hardware and software that are used to provide predetermined functions in support of a processor that is used to host operating system 104. In one example embodiment, embedded controller 102 can interface with firmware 106, UEFI 112 of payload 108, operating system 104 and other suitable systems and components, and can receive data from those systems, provide control data to those systems and provide other suitable functions as discussed and described herein.

Operating system 104 can be implemented as one or more algorithms that are configured to control a processor to allow the processor to execute one or more algorithmic software applications that are stored in a memory device of the processor or associated external memory devices, such as read only memory devices and random access memory devices. In one example embodiment, operating system 104 can interface with bootloader 110 of payload 108, embedded controller 102 and other suitable systems and components, and can receive data from those systems, provide control data to those systems and provide other suitable functions as discussed and described herein.

Firmware 106 can be implemented as one or more algorithms that are configured to control a processor to allow the processor to execute one or more algorithmic software applications that are stored in a memory device of the processor or associated external memory devices, such as read only memory devices and random access memory devices. In one example embodiment, firmware 106 can interface with bootloader 110 and UEFI 112 of payload 108, embedded controller 102 and other suitable systems and components, and can receive data from those systems, provide control data to those systems and provide other suitable functions as discussed and described herein.

Payload 108 can be implemented as one or more algorithms that are configured to control a processor to allow the processor to execute one or more algorithmic software applications that are stored in a memory device of the processor or associated external memory devices, such as read only memory devices and random access memory devices. In one example embodiment, payload 108 can interface with firmware 106, operating system 104, embedded controller 102 and other suitable systems and components, and can receive data from those systems, provide control data to those systems and provide other suitable functions as discussed and described herein.

Bootloader 110 can be implemented as one or more algorithms that are configured to control a processor to allow the processor to execute one or more algorithmic software applications that are stored in a memory device of the processor or associated external memory devices, such as read only memory devices and random access memory devices. In one example embodiment, bootloader 110 can interface with firmware 106, operating system 104 and other suitable systems and components, and can receive data from those systems, provide control data to those systems and provide other suitable functions as discussed and described herein.

UEFI 112 can be implemented as one or more algorithms that are configured to control a processor to allow the processor to execute one or more algorithmic software applications that are stored in a memory device of the processor or associated external memory devices, such as read only memory devices and random access memory devices. In one example embodiment, UEFI 112 can interface with firmware 106, embedded controller 102 and other suitable systems and components, and can receive data from those systems, provide control data to those systems and provide other suitable functions as discussed and described herein.

In operation, system 100 provides pre-boot and operating system interoperability, to allow diagnostics information to be securely exchanged between firmware 106 and/or operating system 104 and UEFI 112 of payload 108. System 100 uses embedded controller 102 to facilitate the exchange of information.

Figure 2:
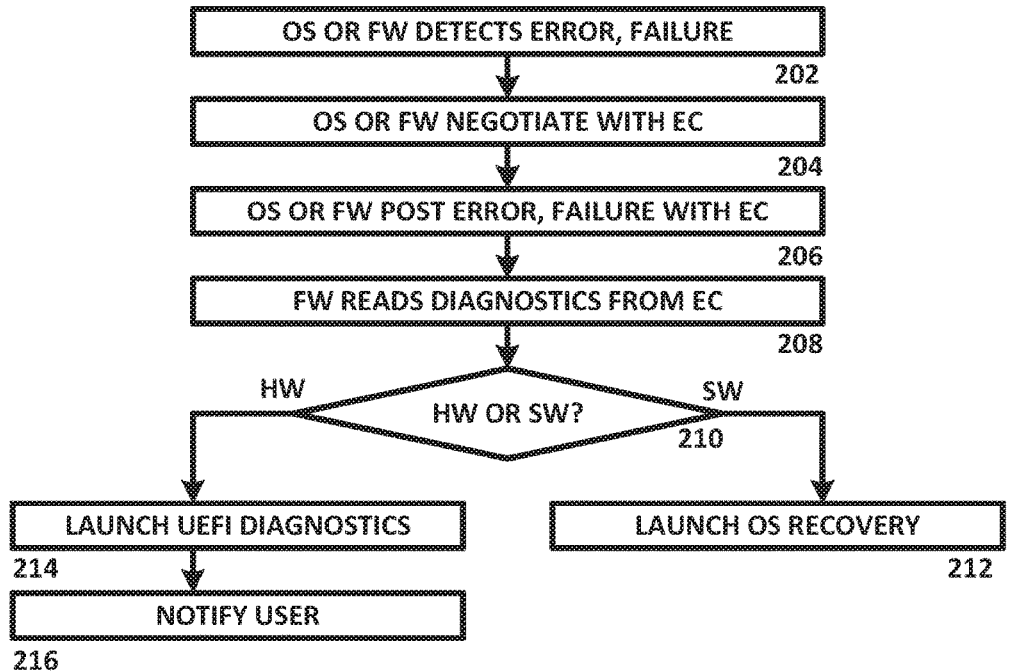
FIG. 2 is a diagram of an algorithm for securely exchanging system diagnostics information between firmware, an operating system and payload, in accordance with an example embodiment of the present disclosure.

FIG. 2 is a diagram of an algorithm 200 for securely exchanging system diagnostics information between firmware, an operating system and payload, in accordance with an example embodiment of the present disclosure. Algorithm 200 can be implemented in hardware or a suitable combination of hardware and software.

Algorithm 200 begins at 202, where an operating system or firmware detects an error, a failure or other non-conforming condition. In one example embodiment, the operating system or firmware can include one or more error detection algorithms, failure detection algorithms or other suitable algorithmic processes that are configured to detect the occurrence or non-occurrence of a predetermined event, such as a response to a data or control signal, a timing signal, or other suitable events. If an event that should occur is detected, or if an event that should not occur during a predetermined time frame does not occur, then the error detection or failure algorithm can generate a null response, otherwise the error detection or failure algorithm can generate a response that indicates that the error or failure has been detected. The algorithm then proceeds to 204.

At 204, the operating system or firmware negotiates with an embedded controller. In one example embodiment, the operating system or firmware can include one or more negotiation algorithms that are configured to interact with the embedded control under predetermined conditions to perform a predetermined negotiation, where the negotiation can be performed to raise a trust level, such as to allow the embedded controller to be used for messaging or for other suitable purposes. The algorithm then proceeds to 206.

At 206, the operating system or firmware posts an error message, a failure message or other suitable messages with the embedded controller. In one example embodiment, the operating system or firmware can include one or more error posting algorithms, failure posting algorithms or other suitable algorithmic processes that are configured to post a message that indicates that the error or failure has been detected. The algorithm then proceeds to 208.

At 208, the firmware reads the diagnostic messages from the embedded controller. In one example embodiment, the firmware can include one or more algorithmic processes that are configured to read a diagnostic message from the embedded controller, such as by requesting data stored in a predetermined buffer, by detecting a sequence of bits in a frame of data or in other suitable manners. The algorithm then proceeds to 210.

At 210, it is determined whether a hardware failure, a software error or some other misoperation has occurred. In one example embodiment, the operating system or firmware can include one or more algorithms that are configured to detect the occurrence of a hardware error, a software error or some other misoperation, and to generate suitable controls to cause additional algorithmic processes to be performed. If it is determined that a hardware failure has occurred, the algorithm proceeds to 214. If it is determined that a software error has occurred, the algorithm proceeds to 212. Likewise, other suitable misoperation or conditions can be detected and a suitable algorithmic process can be performed for that misoperation, such as by proceeding to 212 or 214 or to another suitable algorithmic branch (not explicitly shown).

At 212, an operating system recovery process is launched. In one example embodiment, the operating system can include one or more algorithms for recovering a previous state, a saved state or other suitable conditions. The algorithm then terminates, returns to 202 or performs other suitable processes.

At 214, UEFI diagnostics are launched. In one example embodiment, the firmware can include one or more algorithms for launching UEFI diagnostics, for performing a predetermined sequence of UEFI diagnostics or other suitable functions. The algorithm then proceeds to 216.

At 216, the user is notified of any hardware failure or other issues identified by the UEFI diagnostics. The algorithm then terminates, returns to 202 or performs other suitable processes.

In operation, algorithm 200 allows firmware and an operating system or systems to communicate using an embedded controller to respond to a hardware error, a software misoperation or other events, such as by assisting the user in reporting a hardware error, initiating software recovery or performing other suitable actions. While algorithm 200 is shown as a flow chart, it can also or alternatively be implemented using object-oriented programming, a state diagram, a ladder diagram or in other suitable manners.

Figure 3:
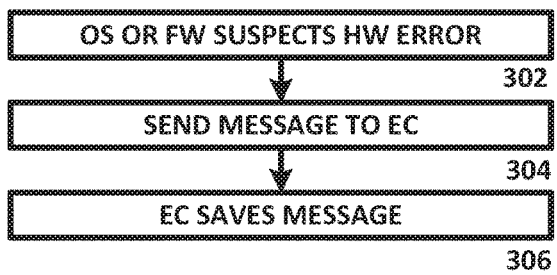
FIG. 3 is a diagram of an algorithm for securely exchanging hardware error information between firmware and/or an operating system and an embedded controller, in accordance with an example embodiment of the present disclosure.

FIG. 3 is a diagram of an algorithm 300 for securely exchanging hardware error information between firmware and/or an operating system and an embedded controller, in accordance with an example embodiment of the present disclosure. Algorithm 300 can be implemented in hardware or a suitable combination of hardware and software.

Algorithm 300 begins at 302, where an operating system and/or firmware suspects a hardware error. In one example embodiment, the operating system and/or firmware can include one or more algorithms that monitor data communications, system responses or other suitable system parameters for operating conditions that indicate a potential hardware error, such as the failure of hardware to respond to a poll, a receipt of unexpected data from hardware, a receipt of incorrect data from the hardware in response to a control or data message, or other suitable data. The algorithm then proceeds to 304.

At 304, the operating system and/or the firmware sends a message to an embedded controller. In one example embodiment, the operating system and/or firmware can include one or more algorithms that assemble non-conforming hardware messages into a single message, such as a log file, that append or include an error code to a message or that perform other suitable functions. The algorithm then proceeds to 306.

At 306, the embedded controller saves the message. In one example embodiment, the embedded controller can include one or more algorithms that store messages that are received from the operating system or firmware in a predetermined memory location, and can further process the message in response to one or more additional algorithms, such as to forward the message to firmware or the operating system, respectively, to perform certain functions such as initiation of a software, firmware or processor function, to perform a function at the embedded controller or to perform other suitable functions.

In operation, algorithm 300 allows firmware and an operating system or systems to securely exchange hardware error information between firmware and/or an operating system and an embedded controller. While algorithm 300 is shown as a flow chart, it can also or alternatively be implemented using object-oriented programming, a state diagram, a ladder diagram or in other suitable manners.

Figure 4:
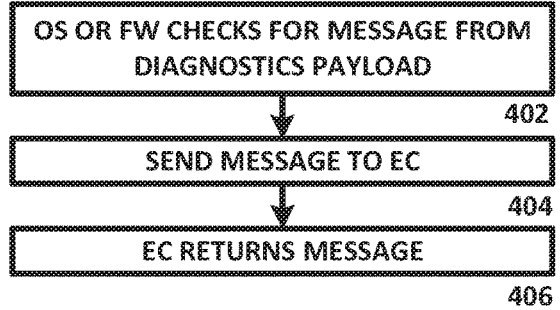
FIG. 4 is a diagram of an algorithm for securely exchanging diagnostics information between firmware and/or an operating system and an embedded controller, in accordance with an example embodiment of the present disclosure.

FIG. 4 is a diagram of an algorithm 400 for securely exchanging diagnostics information between firmware and/or an operating system and an embedded controller, in accordance with an example embodiment of the present disclosure. Algorithm 400 can be implemented in hardware or a suitable combination of hardware and software.

Algorithm 400 begins at 402, where an operating system and/or firmware checks for a message from a diagnostics payload, system or process. In one example embodiment, the operating system and/or firmware can include one or more algorithms that perform diagnostic functions, that interface with one or more diagnostics payload, system or process, or that perform other suitable functions. In this example embodiment, the diagnostics payload, system or process can be temporarily installed for performing diagnostics or other suitable systems or processes can be used. The algorithm then proceeds to 404.

At 404, the operating system and/or the firmware sends a message to an embedded controller. In one example embodiment, the operating system and/or firmware can include one or more algorithms that assemble diagnostic messages into a single message, such as a log file, that append or include a diagnostic code to a message or that perform other suitable functions. The algorithm then proceeds to 406.

At 406, the embedded controller returns the message. In one example embodiment, the embedded controller can include one or more algorithms that return messages that are received from the operating system or firmware to firmware or the operating system, respectively, that perform certain functions such as initiation of a software, firmware or processor function, that perform a function at the embedded controller or that perform other suitable functions.

In operation, algorithm 400 allows firmware and an operating system or systems to securely exchange diagnostic information between firmware and/or an operating system and an embedded controller. While algorithm 400 is shown as a flow chart, it can also or alternatively be implemented using object-oriented programming, a state diagram, a ladder diagram or in other suitable manners.

Figure 5:
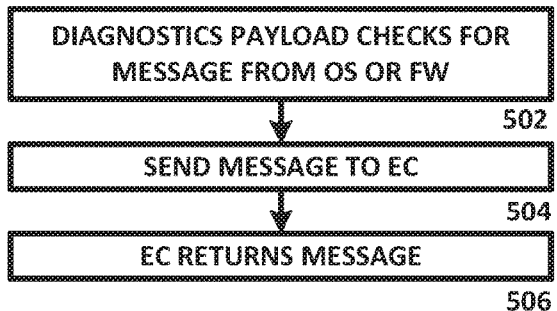
FIG. 5 is a diagram of an algorithm for using diagnostics to evaluate firmware and/or an operating system and to communicate with an embedded controller, in accordance with an example embodiment of the present disclosure.

FIG. 5 is a diagram of an algorithm 500 for using diagnostics to evaluate firmware and/or an operating system and to communicate with an embedded controller, in accordance with an example embodiment of the present disclosure. Algorithm 500 can be implemented in hardware or a suitable combination of hardware and software.

Algorithm 500 begins at 502, where a diagnostics payload, system or process checks the operating system and/or firmware. In one example embodiment, the diagnostics payload, system or process can include one or more algorithms that monitor data communications with the operating system and/or firmware, operating system and/or firmware responses or other suitable operating system and/or firmware parameters for diagnostic responses or other suitable data. The algorithm then proceeds to 504.

At 504, the diagnostic system or process sends a message to an embedded controller. In one example embodiment, the diagnostic system or process can include one or more algorithms that assemble non-conforming hardware messages into a single message, such as a log file, that append or include an error code to a message or that perform other suitable functions. The algorithm then proceeds to 506.

At 506, the embedded controller returns the message. In one example embodiment, the embedded controller can include one or more algorithms that return messages that are received from a diagnostic system or process to the operating system or firmware, that perform certain functions such as initiation of a software, firmware or processor function, that perform a function at the embedded controller or that perform other suitable functions.

In operation, algorithm 500 uses diagnostics to evaluate firmware and/or an operating system and to communicate with an embedded controller. While algorithm 500 is shown as a flow chart, it can also or alternatively be implemented using object-oriented programming, a state diagram, a ladder diagram or in other suitable manners.

Figure 6:
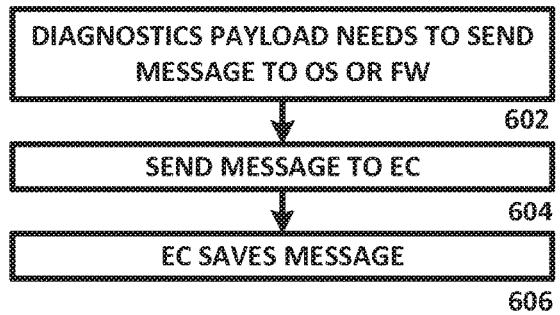
FIG. 6 is a diagram of an algorithm for using diagnostics to communicate with firmware and/or an operating system and to communicate with an embedded controller, in accordance with an example embodiment of the present disclosure.

FIG. 6 is a diagram of an algorithm 600 for using diagnostics to communicate with firmware and/or an operating system and to communicate with an embedded controller, in accordance with an example embodiment of the present disclosure. Algorithm 600 can be implemented in hardware or a suitable combination of hardware and software.

Algorithm 600 begins at 602, where a diagnostics payload, system or process sends a message to an operating system and/or firmware. In one example embodiment, the diagnostic payload, system or process can include one or more algorithms that send messages or other suitable data to an operating system and/or firmware. The algorithm then proceeds to 604.

At 604, the diagnostic system or process sends a message to an embedded controller. In one example embodiment, the diagnostic system or process can include one or more algorithms that assemble diagnostic data or messages into a single message, such as a log file, that append or include a diagnostic code to a message or that perform other suitable functions. The algorithm then proceeds to 606.

At 606, the embedded controller saves the message. In one example embodiment, the embedded controller can include one or more algorithms that store messages that are received from a diagnostic system or process in a predetermined memory location, and can further process the message in response to one or more additional algorithms, such as to forward the message to firmware or the operating system, respectively, to perform certain functions such as initiation of a software, firmware or processor function, to perform a function at the embedded controller or to perform other suitable functions.

In operation, algorithm 600 uses diagnostics to communicate with firmware and/or an operating system and to communicate with an embedded controller. While algorithm 600 is shown as a flow chart, it can also or alternatively be implemented using object-oriented programming, a state diagram, a ladder diagram or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for secure processing of intra-processor data comprising:
    a processor;
    firmware configured to operate on the processor;
    an operating system configured to operate on the processor;
    payload configured to operate on the processor; and
    an embedded controller coupled to the firmware, the operating system and the payload, wherein the embedded controller is configured to enable messaging between the firmware, the operating system and the payload;
    wherein the operating system is configured to monitor a hardware system to detect a potential error and to generate a message to the embedded controller to report the potential error.

2. The system of claim 1 wherein the firmware is configured to monitor the hardware system to detect a second potential error.

3. The system of claim 2 wherein the firmware is configured to generate a second message to the embedded controller to report the second potential error.

4. The system of claim 3 wherein the embedded controller is configured to transmit the second message to the operating system.

5. The system of claim 3 wherein the embedded controller is configured to transmit the second message to the payload.

6. The system of claim 1 wherein the embedded controller is configured to transmit the message to the firmware.

7. The system of claim 1 wherein the embedded controller is configured to transmit the message to the payload.

8. The system of claim 1 wherein the embedded controller is configured to perform a diagnostic service.

9. The system of claim 1 wherein the embedded controller is configured to perform a diagnostic service as a Unified Extensible Firmware Interface (UEFI) payload firmware component on the firmware or the operating system.

10. A method for secure processing of intra-processor data comprising:
    configuring firmware to operate on a processor;
    configuring an operating system to operate on the processor;
    configuring payload to operate on the processor;
    configuring an embedded controller that is coupled to the firmware, the operating system and the payload to enable messaging between the firmware, the operating system and the payload;
    configuring the operating system to monitor a hardware system to detect a potential error; and
    configuring the operating system to generate a message to the embedded controller to report the potential error.

11. The method of claim 10 further comprising configuring the firmware to monitor the hardware system to detect a second potential error.

12. The method of claim 11 further comprising configuring the firmware to generate a second message to the embedded controller to report the second potential error.

13. The method of claim 12 further comprising configuring the embedded controller to transmit the second message to the operating system.

14. The method of claim 12 further comprising configuring the embedded controller to transmit the second message to the payload.

15. The method of claim 10 further comprising configuring the embedded controller to transmit the message to the firmware.

16. The method of claim 10 further comprising configuring the embedded controller to transmit the message to the payload.

17. A system for secure processing of intra-processor data comprising:
    a processor;
    firmware configured to operate on the processor;
    an operating system configured to operate on the processor;
    payload configured to operate on the processor; and
    an embedded controller coupled to the firmware, the operating system and the payload, wherein the embedded controller is configured to enable messaging between the firmware, the operating system and the payload, wherein the embedded controller is configured to perform a diagnostic service as a Unified Extensible Firmware Interface (UEFI) payload firmware component on the firmware or the operating system.

18. The system of claim 17 wherein the firmware is configured to monitor a hardware system to detect a potential error.

19. The system of claim 18 wherein the firmware is configured to generate a message to the embedded controller to report the potential error.

20. The system of claim 19 wherein the embedded controller is configured to transmit the message to the operating system.

* * * * *